United States Patent
Wang et al.

(10) Patent No.: US 7,233,117 B2
(45) Date of Patent: Jun. 19, 2007

(54) INVERTER CONTROLLER WITH FEED-FORWARD COMPENSATION

(75) Inventors: Zhao Wang, Beijing (CN); Ruiqing Xu, Beijing (CN)

(73) Assignee: O2Micro International Limited, Georgetown, Grand Cayman (KY)

( * ) Notice: Subject to any disclaimer, the term of this patent is extended or adjusted under 35 U.S.C. 154(b) by 0 days.

(21) Appl. No.: 11/199,906

(22) Filed: Aug. 9, 2005

(65) Prior Publication Data

US 2007/0035259 A1 Feb. 15, 2007

(51) Int. Cl.
*H05B 41/36* (2006.01)

(52) U.S. Cl. .................................. 315/307; 363/21.09

(58) Field of Classification Search ............ 315/169.1, 315/169.3, 224, 291, 307, 309, 310; 363/13, 363/15, 21.09, 21.11, 21.12, 21.17, 41, 43
See application file for complete search history.

(56) References Cited

U.S. PATENT DOCUMENTS

| | | | |
|---|---|---|---|
| 4,809,150 A | 2/1989 | Limuti et al. | |
| 5,565,819 A | 10/1996 | Cooper | |
| 6,259,615 B1 | 7/2001 | Lin | |
| 6,900,624 B2 | 5/2005 | Abo | |
| 6,903,537 B2 * | 6/2005 | Tzeng et al. | 323/268 |
| 6,911,786 B2 * | 6/2005 | Qiu | 315/209 PZ |
| 6,927,989 B2 * | 8/2005 | Fukumoto | 363/95 |
| 6,982,889 B2 * | 1/2006 | Fukumoto | 363/98 |
| 7,046,526 B2 * | 5/2006 | Toda et al. | 363/24 |
| 7,067,988 B2 * | 6/2006 | Suzuki | 315/224 |
| 7,095,632 B2 * | 8/2006 | Fukumoto | 363/17 |
| 7,095,635 B2 * | 8/2006 | Fukumoto | 363/21.09 |

* cited by examiner

*Primary Examiner*—Shih-Chao Chen
*Assistant Examiner*—Minh Dieu A
(74) *Attorney, Agent, or Firm*—Carlton Fields, P.A.; Li K. Wang, Esq.

(57) ABSTRACT

The present invention is an inverter controller with feed-forward compensation. The inverter controller includes an error amplifier, a high frequency oscillator (HFOSC) with feed-forward compensation, a comparator, and a driver. The error amplifier can output a signal independent on the variation of a supply voltage. The HFOSC can generate a saw-tooth signal with a constant frequency and an amplitude proportional to the supply voltage. The comparator can compare the signal with the saw-tooth signal and generate a pulse width modulation signal whose duty cycle varies with the variation of the supply voltage. The driver receives the PWM signal and provides a proper pulse width modulation signal to drive an external inverter.

19 Claims, 5 Drawing Sheets

INVERTER CONTROLLER WITH FEED-FORWARD COMPENSATION

FIELD OF THE INVENTION

The present invention relates generally to electronic display devices and in particular to brightness control of the electronic display devices.

BACKGROUND OF THE INVENTION

The increasing demand for higher performance liquid crystal display (LCD) has resulted in a continuous development of inverter controllers for cold cathode fluorescent lamps (CCFL) and incorporation of such inverter controllers into integrated circuits. Many LCD applications, such as in notebook, LCD monitor, LCD TV and other display devices, require the use of an inverter controller with high-efficiency to drive the CCFL. These LCD applications typically require fast response to variations of a supply voltage and good driving signals with fixed frequency and desirable duty cycle to increase the system efficiency and longevity of the LCD applications.

Generally, the inverter controller can provide a pulse width modulation (PWM) signal with a certain frequency and a duty cycle to an inverter circuit. The inverter circuit can convert a DC signal such as the supply voltage, into an alternating current (AC) signal to supply power to drive a plurality of loads, such as the CCFL in various display applications. The inverter controller is usually configured to control the required power to ignite the CCFL through the inverter circuit. In order to provide the required power to the loads, the inverter controller is required to adjust its output signal when the supply voltage varies under various conditions.

The inverter controller typically consists of an error amplifier, a comparator for PWM, and a driver. These three components are coupled in series. A compensation capacitor can be coupled between an output terminal of the error amplifier and an input terminal of the comparator. In addition, the inverter controller is coupled in series with the inverter circuit to generate a desirable signal to the loads. Conventionally, the inverter controller may respond to the variations of the supply voltage by regulating a PWM controlling signal at the output terminal of the error amplifier. However, the regulation speed of the inverter controller can be adversely influenced by charging or discharging the compensation capacitor that is connected to the output terminal of the error amplifier. Consequently, the variation of the PWM controlling signal under the control of a variable supply voltage will cause the duty cycle of the PWM signal to vary. The variation of the duty cycle of the PWM signal that will control the supply power to the CCFL through the inverter will have an inverse effect on the brightness of the CCFL.

The error amplifier can also be implemented with a bias current inversely proportional to the supply voltage to realize feed-forward compensation. However, it is difficult to design the integrated circuit with the bias current that is a precisely and inversely proportional to the supply voltage. In other words, the precision of the inverse proportionality between the bias current and the supply voltage makes the configuration of the integrated circuit more complex.

Thus, there is a need to overcome the above drawbacks and disadvantages in the prior art and to provide a circuitry solution with feed-forward compensation that features simple configuration, high efficiency, reliable ignition of the CCFL, and higher and precise frequency. Therefore, it is to such need the invention primarily directed.

SUMMARY OF THE INVENTION

In one embodiment, the invention is an inverter controller with feed-forward compensation. The inverter controller includes an error amplifier, a comparator, a driver, and an oscillator with feed-forward compensation. The error amplifier can generate an amplified error voltage. The error amplifier has a first input terminal for receiving a reference voltage, a second input terminal for receiving a feedback voltage, a third input terminal, and an output terminal. The comparator can provide a pulse width modulation (PWM) signal. The comparator has a first input terminal, a second input terminal and an output terminal. The first input terminal of the comparator is coupled to the output terminal of the error amplifier. The driver can provide an output signal to an external circuit. The driver has an input terminal and an output terminal. The input terminal of the driver is coupled to the output terminal of the comparator and the output terminal of the driver provides the output signal to drive the external circuit. The oscillator with feed-forward compensation has an output terminal. The output terminal of the oscillator is coupled to the second input terminal of the comparator.

In another embodiment, the invention is a device for brightness control of a display screen. The device includes at least one cold cathode fluorescent lamp (CCFL), an inverter circuit for generating an AC signal as a power supply to the at least one CCFL, a feedback circuit for converting a current from the at least one CCFL into a feedback voltage, and an inverter controller with feed-forward compensation. The inverter controller includes an error amplifier, a comparator, a driver, and an oscillator with feed-forward compensation. The error amplifier can generate an amplified error voltage. The error amplifier has a first input terminal for receiving a reference voltage, a second input terminal for receiving a feedback voltage from the feedback circuit, a third input terminal, and an output terminal. The comparator can provide a pulse width modulation (PWM) signal. The comparator has a first input terminal, a second input terminal and an output terminal. The first input terminal of the comparator is coupled to the output terminal of the error amplifier. The driver can provide an output signal to the inverter circuit. The driver has an input terminal and an output terminal. The input terminal of the driver is coupled to the output terminal of the comparator and the output terminal of the driver provides the output signal to drive the inverter circuit. The oscillator with feed-forward compensation has an output terminal. The output terminal of the oscillator is coupled to the second input terminal of the comparator.

In yet another embodiment, the invention is a method for compensating an output signal in an inverter controller with feed-forward compensation. The method includes the steps for generating a predetermined amplified voltage independent on variations of a supply voltage, generating a sawtooth signal at an oscillator with feed-forward compensation, wherein the amplitude of the saw-tooth signal varies proportionally to the supply voltage, obtaining a pulse width modulation signal with a predetermined frequency by comparing the predetermined amplified voltage and the sawtooth signal, and outputting a signal based on the pulse width modulation signal to an external inverter circuit.

In yet another embodiment, the invention is a device for controlling an electronic display. The device includes at least one cold cathode fluorescent lamp (CCFL), an inverter circuit, a feedback circuit, an inverter controller, and a timer component. A current flows through the at least one CCFL. The inverter circuit can receive a pulse width modulation signal and generate an AC signal as a power supply to the at least one CCFL. The feedback circuit can convert the current from the at least one CCFL into a feedback voltage. The inverter controller includes an oscillator with feed-forward compensation. The oscillator can generate an output signal which has an amplitude. The oscillator is capable of adjusting the amplitude of the output signal. The adjustment of the amplitude of the output signal affects the pulse width modulation signal generated by the inverter controller, thus affecting the brightness of the at least one CCFL. The timer component is connected to the oscillator to control the frequency of the output signal.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE INVENTION

Figure 1:
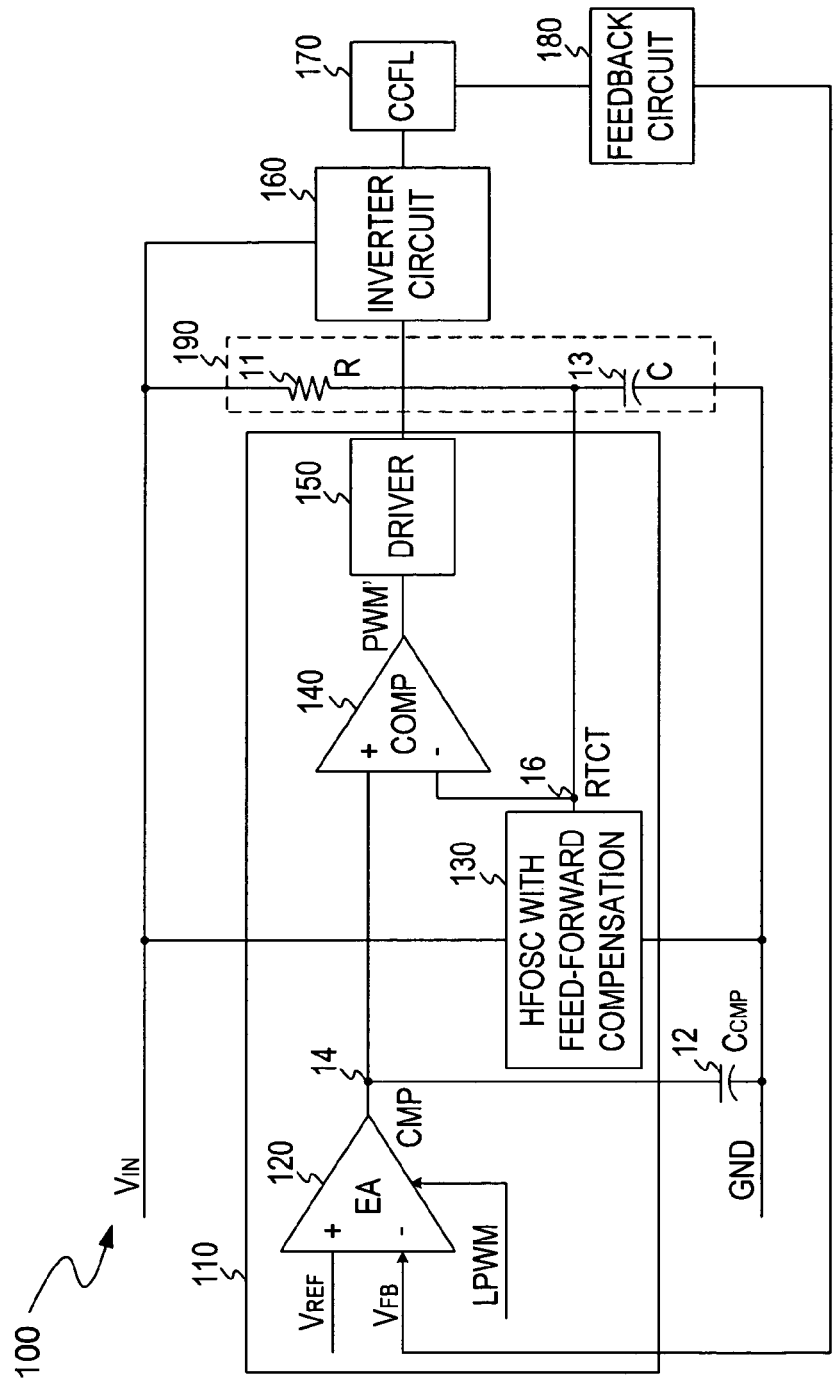
FIG. 1 is a block diagram of a device including an inverter controller with feed-forward compensation in accordance with one embodiment of the present invention.

FIG. 1 illustrates a block diagram of a device 100 including an inverter controller with feed-forward compensation in accordance with one embodiment of the present invention. Traditionally, the device 100 includes an inverter controller 110, an inverter circuit 160, a timer component 190 consisting of a resistor 11 and a capacitor 13, a feedback circuit 180, a compensation capacitor 12, and a load, such as at least one cold cathode fluorescent lamp (CCFL) 170. In this embodiment, the inverter circuit 160 is a DC/AC converter. The inverter controller 110 usually includes an error amplifier 120, a comparator 140 for pulse width modulation (PWM), and a driver 150. The inverter controller 110 can further include a high frequency oscillator with feed-forward compensation (HFOSC) 130. A supply voltage $V_{IN}$ is provided to the HFOSC 130, the timer component 190, and the inverter circuit 160.

In the inverter controller 110, the error amplifier 120 can receive a reference voltage $V_{REF}$ at a non-inverting input terminal and a feedback voltage $V_{FB}$ from the feedback circuit 180 at an inverting input terminal. A low frequency PWM dimming signal (LPWM) from an external circuit is a digital signal converted from an analog signal that is defined by the users. The signal LPWM is received at another input terminal of the error amplifier 120. The LPWM acts as a controlling signal of the error amplifier 120 and can control the power to the CCFL 170. The error amplifier 120 can output a voltage signal CMP at its output terminal that is connected to a node 14. The error amplifier 120 can amplify a differential value between the reference voltage $V_{REF}$ and the feedback voltage $V_{FB}$ and then generate the amplified voltage signal CMP at the node 14 under the control of the signal LPWM. When the signal LPWM is low, the voltage signal CMP at the node 14 is set from high to low. This switch of the voltage signal CMP can be implemented within a fall time because of the discharging of the compensation capacitor 12. When the signal LPWM is high, the voltage signal CMP at the node 14 is set from low to high. This switch of the voltage signal CMP can also be implemented within a rise time resulting from the charging of the compensation capacitor 12.

The HFOSC 130 has an output terminal that is connected to the timer component 190 through a node 16. The resistor 11 and the capacitor 13 of the timer component 190 can provide a saw-tooth signal RTCT with a certain frequency to the node 16. The HFOSC 130 can regulate the amplitude of the saw-tooth signal RTCT that is proportional to the supply voltage $V_{IN}$ to implement feed-forward compensation. Therefore, the saw-tooth signal RTCT with its amplitude proportional to the supply voltage $V_{IN}$ is generated at the node 16 and then provided to the comparator 140.

The comparator 140 receives the voltage signal CMP from the node 14 at its non-inverting input terminal, and the saw-tooth signal RTCT from the node 16 at its inverting input terminal. The comparator 140 can compare the voltage signal CMP from the error amplifier 120 with the saw-tooth signal RTCT generated by the HFOSC 130 and the timer component 190. The voltage signal CMP at the node 14 and the saw-tooth signal RTCT at the node 16 are used by the comparator 140 to set the pulse width of a pulse width modulation signal PWM' at an output terminal of the comparator 140.

The driver 150 receives the signal PWM' with the predetermined frequency and a certain duty cycle determined by comparison of the voltage signal CMP and the saw-tooth signal RTCT from the comparator 140. The driver 150 can provide a pulse width modulation signal that drives the inverter circuit 160. The inverter circuit 160 can convert the supply voltage $V_{IN}$ into a controllable AC signal to supply power to the CCFL 170.

The feedback circuit 180 receives a current from the CCFL 170, and transfers the current into a voltage signal. The voltage signal as the feedback voltage $V_{FB}$ is transmitted back to the error amplifier 120.

Figure 2:
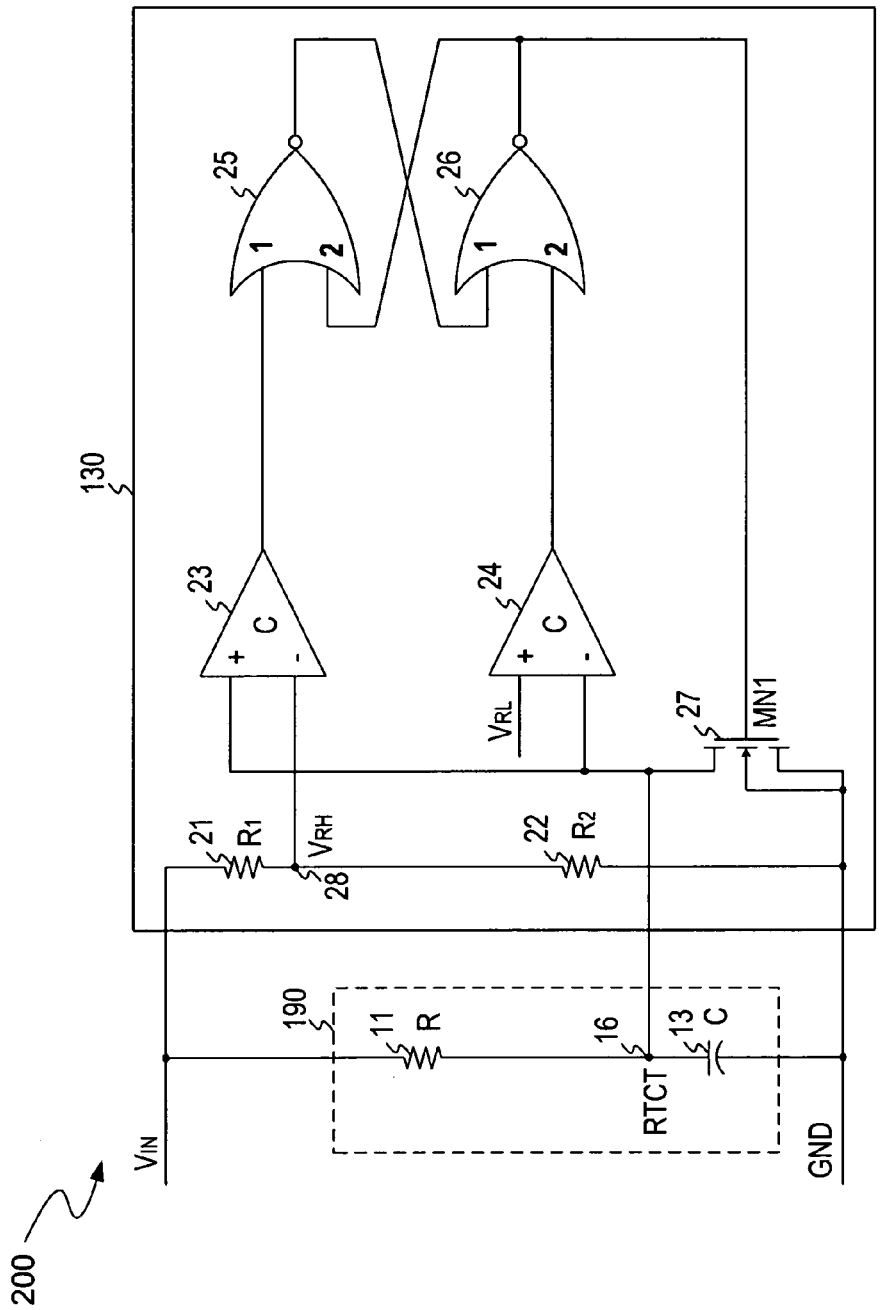
FIG. 2 is a schematic diagram of an exemplary embodiment of an oscillator topology of FIG. 1.

FIG. 2 illustrates a schematic diagram of an exemplary oscillator of FIG. 1. In this embodiment 200, the CCFL 170 (not shown in FIG. 2) operates in a normal mode. The exemplary high frequency oscillator with feed-forward compensation (HFOSC) 130 consists of resistors 21 and 22, comparators 23 and 24, NOR gates 25 and 26, and a NMOS transistor 27. The HFOSC 130 can regulate the amplitude of the saw-tooth signal RTCT at the node 16.

In the HFOSC 130, the resistors 21 and 22 are coupled in series to scale down the supply voltage $V_{IN}$, and the scaled-down voltage $V_{RH}$ at a node 28 is provided to an inverting input terminal of the comparator 23. The value of $V_{RH}$ is determined by the values of the resistors 21 and 22, as given by equation (1) below. The saw-tooth signal RTCT at the node 16 is provided to a non-inverting input terminal of the comparator 23, an inverting input terminal of the comparator 24, and a drain terminal of the NMOS transistor 27. The comparator 23 can compare the saw-tooth signal RTCT at its non-inverting input terminal with the voltage $V_{RH}$ at its inverting input terminal and then generate a signal. The signal is provided to one input terminal of the NOR gate 25. The comparator 24 receives a constant voltage $V_{RL}$ from a voltage source (not shown) that is close to the ground voltage to minimize frequency variations at its non-inverting input terminal. For example, the voltage $V_{RL}$ can be only 0.1 volts. The comparator 24 can compare the voltage $V_{RL}$ with the saw-tooth signal RTCT and then generate a signal that is provided to one input terminal of the NOR gate 26. The NOR gates 25 and 26 may operate under the control of the signals from the comparators 23 and 24 and work as a RS flip-flop. The RS flip-flop can output a signal at an output terminal of the NOR gate 26. Since the output terminal of the NOR gate 26 is connected to a gate terminal of the NMOS transistor 27, the signal from the RS flip-flop will control the NMOS transistor 27 to operate in different situations.

$$V_{RH} = \frac{R_1}{R_1 + R_2} V_{IN} \quad (1)$$

Wherein R1 is the resistance of the resistor 21, and R2 is the resistance of the resistor 22. $V_{IN}$ represents the supply voltage.

In the normal mode, if the saw-tooth signal RTCT at the node 16 is smaller than the voltage $V_{RH}$ at the node 28, the comparator 23 outputs "0." The RS flip-flop formed by the NOR gates 25 and 26 can generate "0" at the output terminal of the NOR gate 26. Since the output terminal of the NOR gate 26 is connected to the gate terminal of the NMOS transistor 27, the gate terminal of the NMOS transistor 27 is set to "0." Therefore, the NMOS transistor 27 is switched off, and the capacitor 13 is charged by the supply voltage $V_{IN}$ through the resistor 11. The charging of the capacitor 13 can cause the saw-tooth signal RTCT at the node 16 to increase.

If the saw-tooth signal RTCT at the node 16 increases to become larger than the voltage $V_{RH}$, the comparator 23 outputs "1." Because the voltage $V_{RL}$ has a very small value, the saw-tooth signal RTCT at the node 16 should be larger than the voltage $V_{RL}$. As a result, the comparator 24 outputs "0." With one input "1" from the comparator 23 and another input "0" from the comparator 24, the RS flip-flop will generate "1" at the output terminal of the NOR gate 26. Consequently, the gate terminal of the NMOS transistor 27 is set to "1." The NMOS transistor 27 will conduct, and as a result, the capacitor 13 is discharged completely through the NMOS transistor 27. Thus, the saw-tooth signal RTCT at the node 16 will decrease. In one embodiment, the NMOS transistor 27 is designed to have a large size, and thus the capacitor 13 can be discharged rapidly. Since the discharging time is very small, the saw-tooth signal RTCT at the node 16 is reduced to zero quickly. Consequently, when the saw-tooth signal RTCT is smaller than the voltage $V_{RH}$, the HFOSC 130 can regulate the saw-tooth signal RTCT until it is equal to the voltage $V_{RH}$. At the moment that the saw-tooth signal RTCT at the node 16 becomes larger than the voltage $V_{RH}$, the saw-tooth signal RTCT at the node 16 will decrease rapidly to zero within the discharging time of the capacitor 13 under control of the HFOSC 130.

Therefore, in the normal mode, the HFOSC 130 can implement the charging and discharging of the capacitor 13 with a predetermined frequency given by equation (2). In the charging process, the capacitor 13 can be charged from zero to its maximum value $V_{RH}$ within a charging time. In the discharging process, the capacitor 13 is discharged rapidly from the value $V_{RH}$ to zero within a discharging time that is very small compared to the oscillating period generated by the timer component 190.

$$f = \frac{1}{RC\ln\frac{V_{IN}}{V_{IN} - V_{RH}}} \quad (2)$$

Wherein R is a resistance of the resistor 11, and C is a capacitance of the capacitor 13. $V_{IN}$ represents the supply voltage. $V_{RH}$ is the scaled-down voltage shown in FIG. 2.

Figure 3:
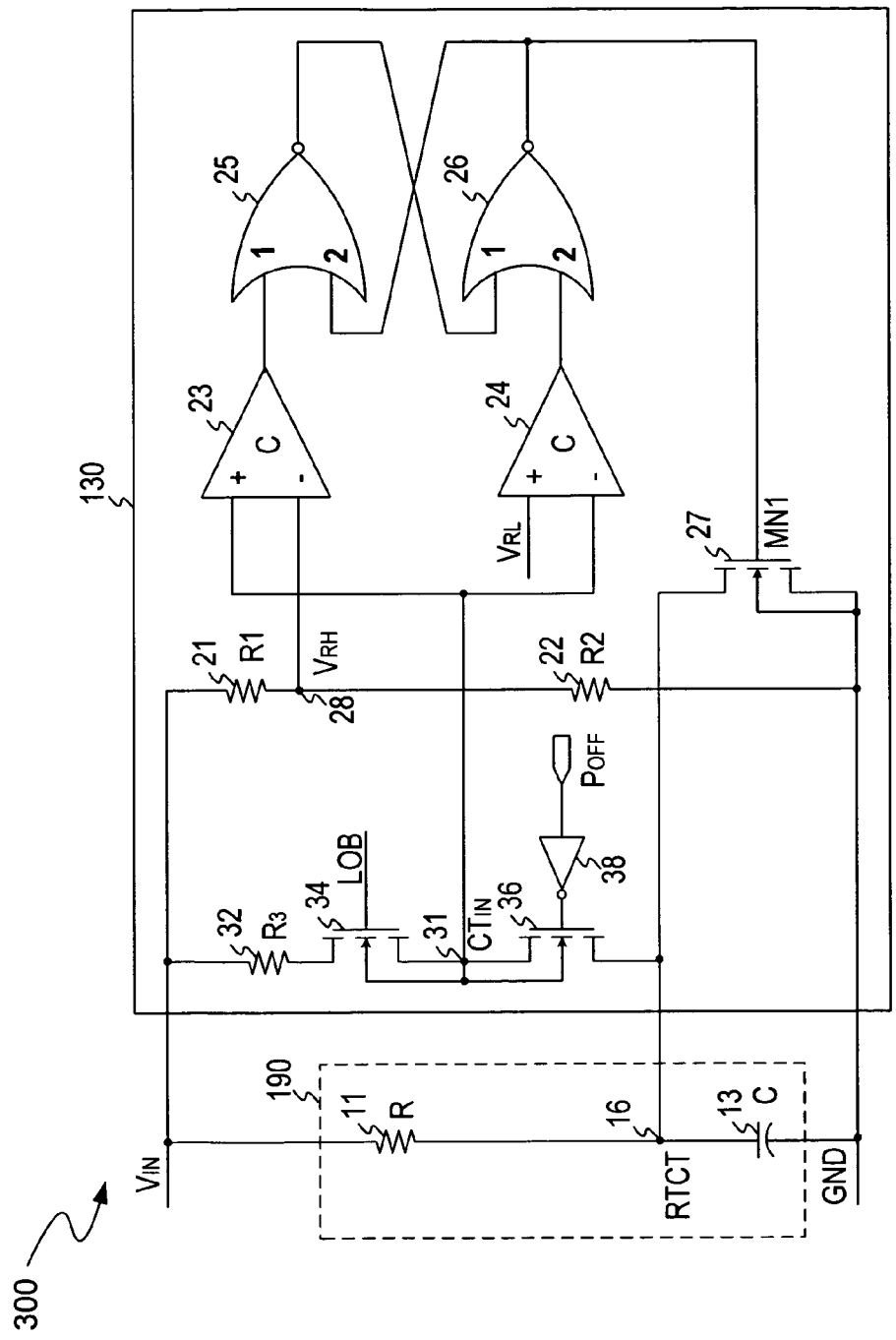
FIG. 3 is a schematic diagram of an alternate embodiment of an oscillator topology of FIG. 1.

Turning to FIG. 3, where some components are similar to those in FIG. 2, these components in FIG. 3 are labeled similarly to those in FIG. 2. The description of similar functions of the same components will be omitted herein for clarity. Only the differences and improvements will be further described in greater detail below.

FIG. 3 is a schematic diagram of an alternative embodiment of an oscillator of FIG. 1. In this embodiment 300, the exemplary HFOSC 130 consists of the resistors 21 and 22, the comparators 23 and 24, the NOR gates 25 and 26, and the NMOS transistor 27. The HFOSC 130 further includes a resistor 32, NMOS transistors 34 and 36, and an inverter 38. A brightness sense signal LOB from the CCFL that is connected to a gate terminal of the NMOS transistor 34 is a flag that indicates whether a striking mode has ended. A signal POFF from an external circuit is an enable signal that controls the operation mode of the CCFL 170. Compared to the embodiment in FIG. 2, the embodiment in FIG. 3 can operate not only in the normal mode, but also in a standby mode and the striking mode.

When the signal POFF is high, the CCFL 170 operates in the standby mode. In the standby mode, the output of the inverter 38 is low. Thus, the NMOS transistor 36 is switched off. As a result, the HFOSC 130 will not operate and all currents in the device 100 are cut off. The CCFL 170 thus is powered off. The power of the circuit 100 can be saved when the CCFL is powered off in the standby mode. In this mode, the voltage at the node 16 is charged by the supply voltage $V_{IN}$. The voltage at the node 16 can remain a constant value $V_{IN}$.

When the signal POFF is switched from high to low and the signal LOB is high, the CCFL 170 will enter its striking mode. In this situation, the NMOS transistors 34 and 36 can conduct at the same time. In the striking mode, the frequency of the saw-tooth signal RTCT at the node 16 can be increased as given by equation (3). However, when the CCFL 170 is ignited, the signal LOB will change to be low. In this condition, the NMOS transistor 34 is switched off, and the NMOS transistor 36 still conducts. The voltage at a node 31 will be equal to the voltage at the node 16 because of the conduction of the NMOS transistor 36. The HFOSC 130 can operate in the normal mode as described above in the FIG. 2.

$$f' = \frac{1}{\left(\frac{R \cdot R_3}{R + R_3}\right) C \ln \frac{V_{IN}}{V_{IN} - V_{RH}}} \quad (3)$$

Wherein R is the resistance of the resistor 11, and $R_3$ is the resistance of the resistor 32. C represents the capacitance of the capacitor 13. $V_{IN}$ represents the supply voltage, and $V_{RH}$ represents the scaled-down voltage.

Figure 4:
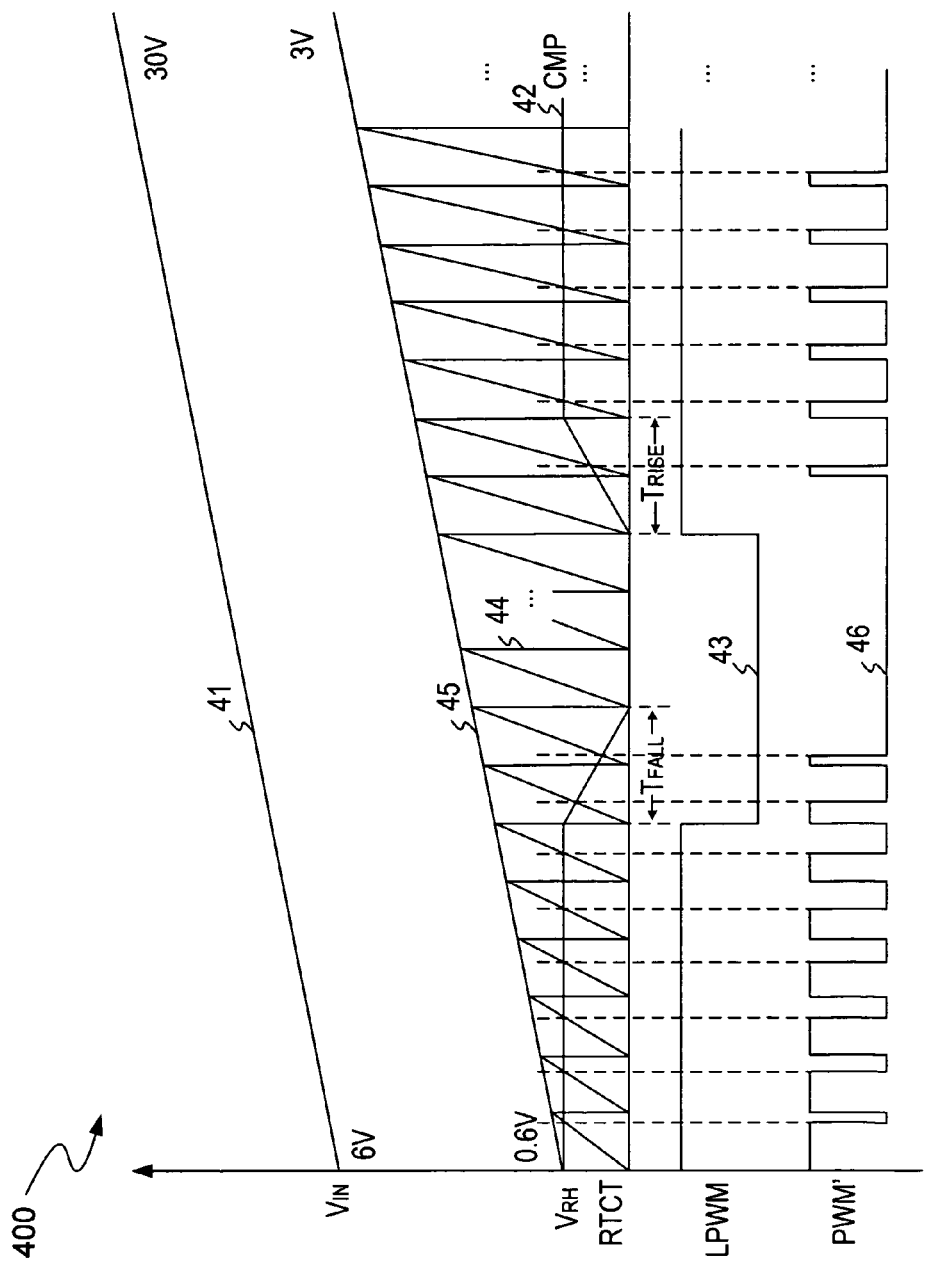
FIG. 4 is a diagram of waveforms of different signals generated by the device of FIG. 1.

Turning to FIG. 4, a diagram 400 of waveforms of different signals generated by the device 100 of FIG. 1 is illustrated. Plot 41 represents the supply voltage $V_{IN}$. In this example, the supply voltage $V_{IN}$ can vary from 6V to 30V in a linear mode. Plot 42 represents the signal CMP generated by the error amplifier 120. The signal CMP does not change with the variation of the supply voltage $V_{IN}$ in plot 41. Plot 43 represents the low frequency PWM dimming signal (LPWM). Plot 44 represents the saw-tooth signal RTCT whose peak value can change proportionally with the supply voltage $V_{IN}$. The peak value of the saw-tooth signal RTCT is equal to the voltage $V_{RH}$ as shown by plot 45. Plot 46 represents the signal PWM' generated by the comparator 140.

When the signal LPWM in plot 43 is deasserted (high), the signal CMP represented by plot 42 changes from low to high within the rise time $T_{RISE}$. In contrast, when the signal LPWM is asserted (low), the signal CMP changes from high to low within the fall time $T_{FALL}$. In a specific circuitry topology, the rise time T$_{RISE}$ and the fall time T$_{FALL}$ are invariable under the control of the signal LPWM.

When the supply voltage V$_{IN}$ varies in the linear form, the peak value of the saw-tooth signal RTCT varies linearly at the same time. Because the discharging time is much smaller than the oscillating period generated by the timer component 190, the discharging time is ignored in plot 44. Therefore, the saw-tooth signal RTCT varies from zero to the peak value according to the oscillating period which is approximately equivalent to the charging time of the capacitor 13. When the signal LPWM is deasserted and the saw-tooth signal RTCT is larger than the signal CMP, the signal PWM' is set to "0." Otherwise, when the signal is deasserted and the saw-tooth signal RTCT is smaller than the signal CMP, the signal PWM' is set to "1." From the diagram 400, the pulse width of the signal PWM' varies when the supply voltage V$_{IN}$ increases in the linear form.

In plot 44, the frequency of the saw-tooth signal RTCT is determined by the equation (2) in the normal mode. The saw-tooth signal RTCT in plot 44 is compared with the signal CMP in plot 42. The comparison of these two signals can generate the signal PWM' in plot 46. With the increase of the supply voltage V$_{IN}$, the pulse width of the signal PWM' generally becomes smaller as shown in FIG. 4. However, note that the comparison of the saw-tooth signal RTCT and the signal CMP during the fall time T$_{FALL}$ and the rise time T$_{RISE}$ can generate some pulses with smaller duty cycle in plot 46. The driver 150 is activated by the signal PWM' and drives the inverter circuit 160. The inverter circuit 160 can convert the supply voltage V$_{IN}$ into an AC signal, and implement the regulation of the power to the CCFL 170. Therefore, the feed-forward compensation is implemented by the inverter controller 110. If the supply voltage V$_{IN}$ decreases, the power to the CCFL 170 is regulated in a reverse manner as described above.

Figure 5:
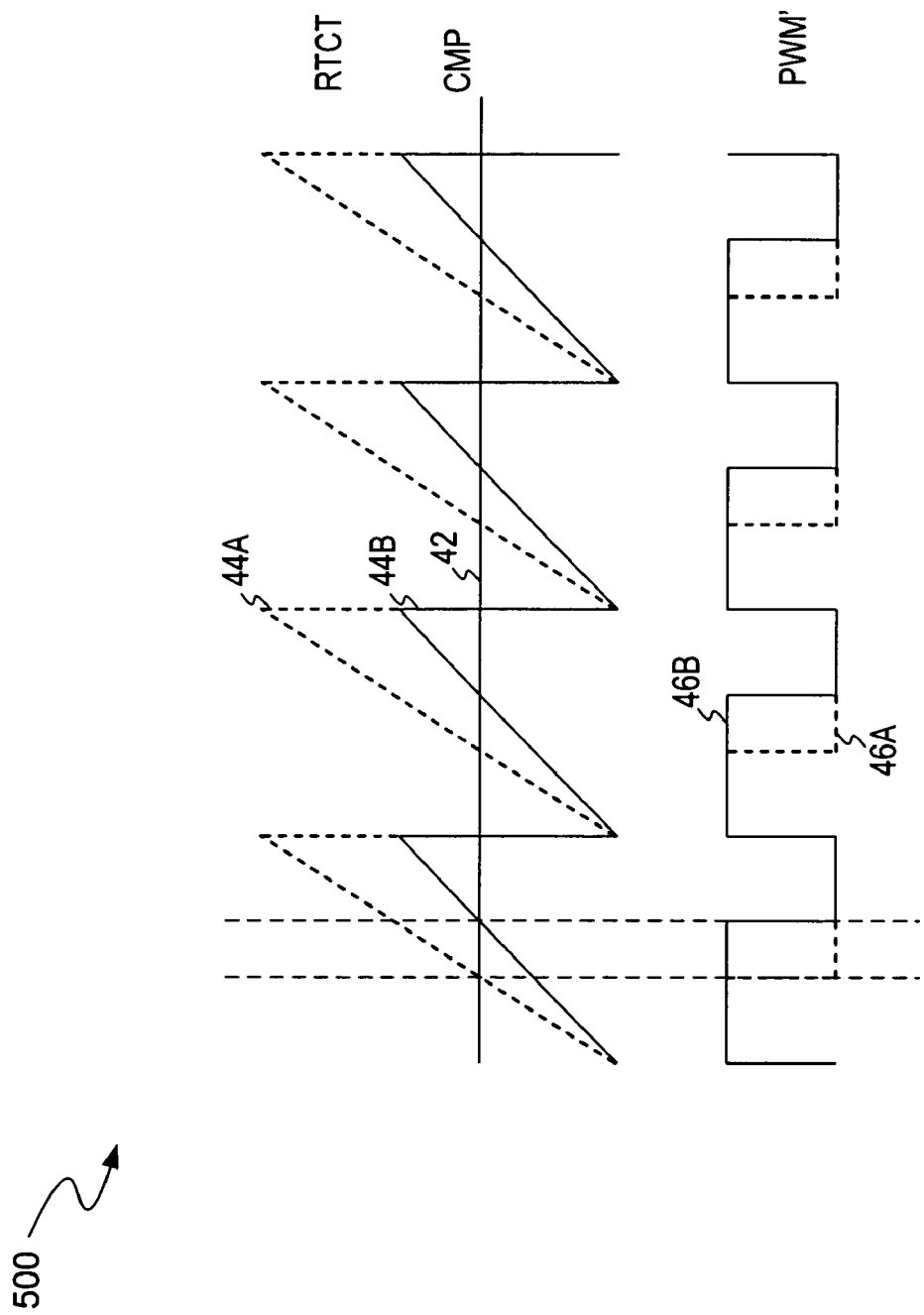
FIG. 5 is a waveform diagram of certain exemplary signals generated by the device of FIG. 1 under different conditions.

With reference to FIG. 5, a waveform diagram 500 of exemplary signals RTCT, CMP and PWM' generated by the device 100 of FIG. 1 is illustrated. The waveform diagram 500 is an illustration of signals RTCT, CMP, and PWM' when the signals LPWM and CMP are high. Plot 44A shows a waveform of the saw-tooth signal RTCT when a higher supply voltage V$_{IN}$ is provided. Plot 46A shows a waveform of the signal PWM' generated by the comparator 140 when the saw-tooth signal RTCT in plot 44A and the signal CMP in plot 42 are received. Similarly, plot 44B shows a waveform of the saw-tooth signal RTCT when a lower supply voltage V$_{IN}$ is provided. Plot 46B is a waveform of the signal PWM' generated by the comparator 140 when the saw-tooth signal RTCT in plot 44B and the signal CMP in plot 42 are provided.

When the higher supply voltage V$_{IN}$ is supplied to the device 100, the peak value of the saw-tooth signal RTCT that is equal to the voltage V$_{RH}$ becomes higher and the charging speed of the capacitor 13 becomes faster. The comparison of the signals RTCT and CMP can result in a smaller pulse width of the signal PWM' as shown in plot 46A. Therefore, the duty cycle of the signal PWM' becomes smaller when a higher supply voltage V$_{IN}$ is provided. The smaller duty cycle of the PWM' can affect the power to the CCFL 170, thus regulating the brightness of the CCFL 170. If a lower supply voltage V$_{IN}$ is provided to the device 100, the signal PWM' will have a larger duty cycle to regulate the brightness of the CCFL 170.

Although the HFOSC 130 is represented in FIG. 2 and FIG. 3, those skilled in the art will appreciate other combination of components may also be used without departing from the spirit of the present invention. The HFOSC 130 can be utilized not only in the DC/AC converter as described above, but also in a DC/DC converter. In addition, the types of various MOS transistors in FIG. 2 and FIG. 3 are for illustration purposes and other types of transistors may also be used. Furthermore, although elements of the invention may be described in the singular, the plural is contemplated unless limitation to the singular is explicitly stated.

In operation, if the enable signal P$_{OFF}$ is high, all the NMOS transistors 27, 34 and 36 are switched off and no current flows through the CCFL 170. The CCFL 170 enters into the standby mode. If the enable signal P$_{OFF}$ is low and the flag signal LOB is high, the CCFL 170 can operate in the striking mode. In the striking mode, the saw-tooth signal RTCT has a higher frequency generated by the resistors 11 and 32, and the capacitor 13. The inverter circuit 160 can supply sufficient power to ignite the CCFL 170.

When the CCFL 170 is ignited, the CCFL 170 will enter into the normal mode. In the normal mode, the time component 190 can provide the saw-tooth signal RTCT with a predetermined frequency. The HFOSC 130 can regulate the amplitude of the saw-tooth signal RTCT. The amplitude of the saw-tooth signal RTCT can vary proportionally with changes in the supply voltage V$_{IN}$. Another signal CMP generated by the error amplifier 120 remains invariable and is independent on the variation of the supply voltage V$_{IN}$. The comparator 140 can compare the saw-tooth signal RTCT with the signal CMP and generate a PWM signal PWM' with a variable duty cycle. As a result, the feed-forward compensation is implemented by the inverter controller 110. The inverter circuit 160 can receive a variable pulse width modulation signal through the driver 150 and regulate the power to the CCFL 170 when the supply voltage V$_{IN}$ changes, and thus the brightness of the CCFL is regulated.

The embodiments that have been described herein are some of the several possible embodiments that utilize this invention and they are described here by way of illustration and not of limitation. It is obvious that many other embodiments, which will be readily apparent to those skilled in the art, may be made without departing materially from the spirit and scope of the invention as defined in the appended claims.

What is claimed is:

1. An inverter controller with feed-forward compensation, comprising:

an error amplifier for generating an amplified error voltage having a first input terminal for receiving a reference voltage, a second input terminal for receiving a feedback voltage, a third input terminal, and an output terminal;

a comparator for providing a pulse width modulation (PWM) signal having a first input terminal, a second input terminal and an output terminal, the first input terminal of the comparator being coupled to the output terminal of the error amplifier;

a driver for providing an output signal to an external circuit, the driver having an input terminal and an output terminal, the input terminal of the driver being coupled to the output terminal of the comparator and the output terminal of the driver providing the output signal to drive the external circuit; and an oscillator with feed-forward compensation having an output terminal coupled to the second input terminal of the comparator, the output terminal of the oscillator providing a signal with an amplitude proportional to a supply voltage.

2. The inverter controller of claim 1, wherein the error amplifier is controlled by a low frequency PWM dimming signal at the third input terminal of the error amplifier.

3. The inverter controller of claim 1, wherein the error amplifier outputs a predetermined signal to the first input terminal of the comparator independent on variations of the supply voltage.

4. The inverter controller of claim 1, wherein the oscillator operates according to a predetermined frequency.

5. The inverter controller of claim 1, wherein the signal provided by the output terminal of the oscillator is a saw-tooth signal.

6. The inverter controller of claim 5, wherein a duty cycle of the PWM signal varies according to amplitude variations of the saw-tooth signal at the output terminal of the oscillator.

7. A device for brightness control of a display screen, comprising:
- at least one cold cathode fluorescent lamp (CCFL);
- an inverter circuit for generating an AC signal as a power supply to the at least one CCFL;
- a feedback circuit for converting a current from the at least one CCFL into a feedback voltage; and
- an inverter controller with feed-forward compensation, wherein the inverter controller comprises:
  - an error amplifier for generating an amplified error voltage having a first input terminal for receiving a reference voltage, a second input terminal for receiving the feedback voltage from the feedback circuit, a third input terminal, and an output terminal;
  - a comparator for providing a pulse width modulation (PWM) signal having a first input terminal, a second input terminal and an output terminal, the first input terminal of the comparator being coupled to the output terminal of the error amplifier;
  - a driver for providing an output signal to drive the inverter circuit, the driver having an input terminal and an output terminal, the input terminal of the driver being coupled to the output terminal of the comparator and the output terminal of the driver providing the output signal to drive the inverter circuit; and
  - an oscillator with feed-forward compensation having an output terminal coupled to the second input terminal of the comparator, the output terminal of the oscillator providing a signal with an amplitude proportional to a supply voltage.

8. The device of claim 7, wherein the inverter circuit converts a DC signal into the AC signal, and the DC signal is the supply voltage.

9. The device of claim 7, wherein the error amplifier is controlled by a low frequency PWM dimming signal at the third input terminal of the error amplifier.

10. The device of claim 7, wherein the error amplifier outputs a predetermined signal to the first input terminal of the comparator independent on variations of the supply voltage.

11. The device of claim 7, wherein the device further comprises a timer component to generate a predetermined frequency.

12. The device of claim 11, wherein the timer component comprises a resistor having a first terminal and a second terminal and a capacitor having a first terminal and a second terminal, the first terminal of the resistor being coupled to the supply voltage, the second terminal of the resistor and the first terminal of the capacitor being coupled to the output terminal of the oscillator, and the second terminal of the capacitor being coupled to the ground.

13. The device of claim 11, wherein the oscillator operates according to the predetermined frequency determined by the timer component.

14. The device of claim 7, wherein the signal provided by the output terminal of the oscillator is a saw-tooth signal.

15. The device of claim 14, wherein a duty cycle of the PWM signal varies according to amplitude variations of the saw-tooth signal at the output terminal of the oscillator to affect the brightness of the at least one CCFL.

16. The device of claim 7, wherein the inverter controller is further coupled to a compensation capacitor for providing compensation to the output signal at the output terminal of the driver, the compensation capacitor being coupled to the output terminal of the error amplifier and the first input terminal of the comparator.

17. A method for compensating an output signal in an inverter controller with feed-forward compensation, comprising the steps for:
- generating a predetermined amplified voltage independent on variations of a supply voltage;
- generating a saw-tooth signal at an oscillator with feed-forward compensation, wherein an amplitude of the saw-tooth signal varies proportionally to the supply voltage;
- obtaining a pulse width modulation signal with a predetermined frequency by comparing the predetermined amplified voltage and the saw-tooth signal; and
- outputting a signal based on the pulse width modulation signal to an external inverter circuit.

18. The method of claim 17, wherein a duty cycle of the pulse width modulation signal varies according to the variations of the supply voltage.

19. A device for controlling an electronic display, comprising:
- at least one cold cathode fluorescent lamp (CCFL), a current flowing through the at least one CCFL;
- an inverter circuit for receiving a pulse width modulation signal and generating an AC signal to the at least one CCFL;
- a feedback circuit for converting the current from the at least one CCFL into a feedback voltage;
- an inverter controller for receiving the feedback voltage and generating the pulse width modulation signal to the inverter circuit, wherein the inverter controller comprises
  - an oscillator with feed-forward compensation, the oscillator generating an output signal, the output signal having an amplitude, the oscillator being capable of adjusting the amplitude of the output signal proportional to a supply voltage, wherein adjustment of the amplitude of the output signal affects the pulse width modulation signal generated by the inverter controller, thus affecting the brightness of the at least one CCFL; and
  - a timer component being connected to the oscillator to control the frequency of the output signal.

* * * * *